(12) United States Patent
Wu

(10) Patent No.: US 6,364,185 B2
(45) Date of Patent: *Apr. 2, 2002

(54) SHEET OR TISSUE DISPENSER BOX HOLDER FOR CLINIC, VEHICLE, FACTORY OR HOUSEHOLD APPLICATIONS

(76) Inventor: Charles Wu, 1469 Abajo Dr., Monterey Park, CA (US) 91754

( * ) Notice: Subject to any disclaimer, the term of this patent is extended or adjusted under 35 U.S.C. 154(b) by 0 days.

This patent is subject to a terminal disclaimer.

(21) Appl. No.: 09/785,710

(22) Filed: Feb. 16, 2001

Related U.S. Application Data

(63) Continuation of application No. 09/318,177, filed on May 25, 1999, now Pat. No. 6,196,435.

(51) Int. Cl.⁷ .............................................. B60R 11/00
(52) U.S. Cl. .................... 224/572; 224/901.8; 150/154; 206/494; 428/35.2; 428/100
(58) Field of Search .................. 224/572, 559, 224/562, 329, 315, 901.8; 221/22, 33, 45, 46, 52; D6/518; D9/337; 428/35.2, 100; 220/737; 150/154, 158, 159, 165; 206/389, 409, 457, 494; 383/33, 43, 109, 121.1

(56) References Cited

U.S. PATENT DOCUMENTS

| | | | | |
|---|---|---|---|---|
| 1,986,256 A | * | 1/1935 | Ellis ........................ | 220/737 X |
| 2,024,884 A | | 12/1935 | Schlegel | |
| 2,035,384 A | * | 3/1936 | Hinchliff .................. | 220/737 X |
| 2,252,616 A | | 8/1941 | Broeren et al. | |
| 2,432,662 A | * | 12/1947 | Gardner ................... | 150/154 X |
| 3,352,449 A | * | 11/1967 | Jackson .................... | 220/737 X |
| 3,507,312 A | * | 4/1970 | Petersen .................. | 220/737 X |
| 4,047,550 A | * | 9/1977 | Scholz ..................... | 150/154 X |
| 4,514,995 A | * | 5/1985 | Curtis et al. ............. | 150/154 X |
| 4,967,988 A | | 11/1990 | Nguyen | |
| 5,165,567 A | * | 11/1992 | Richardson et al. ..... | 150/154 X |
| D332,677 S | * | 1/1993 | Samelson ..................... | D34/1 |
| 5,305,907 A | * | 4/1994 | Richardson et al. ..... | 150/154 X |
| 5,325,986 A | * | 7/1994 | Richardson et al. ..... | 150/154 X |
| 5,553,733 A | | 9/1996 | Rosenthal | |
| 5,672,186 A | | 9/1997 | Chesley et al. | |
| 6,112,936 A | * | 5/2000 | Arizmendi .................... | 221/45 |

FOREIGN PATENT DOCUMENTS

| | | |
|---|---|---|
| FR | 2442497 | 6/1980 |
| GB | 2185948 | 8/1987 |

* cited by examiner

Primary Examiner—Stephen K. Cronin
(74) Attorney, Agent, or Firm—Richard E. Bee

(57) ABSTRACT

A sheet material dispenser box holder, such as a cosmetic tissue box holder, is made of elastic cord or strap material in a woven fish-net pattern forming a bag shaped container closed at the top except for an access opening for easy placement of a tissue box inside the box holder. Attachment means are fastened to the box holder for securing the box holder in a desired position on a support surface whereby it will remain reliably in any attitude of a vehicle or other surface to which it is mounted and readily allowing removal of individual tissue sheets.

13 Claims, 2 Drawing Sheets

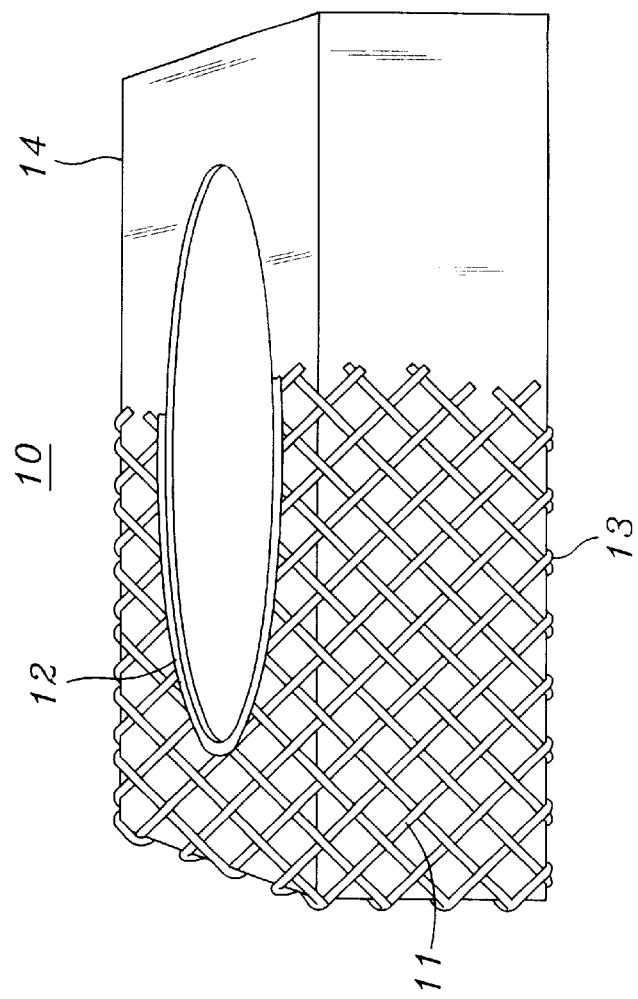
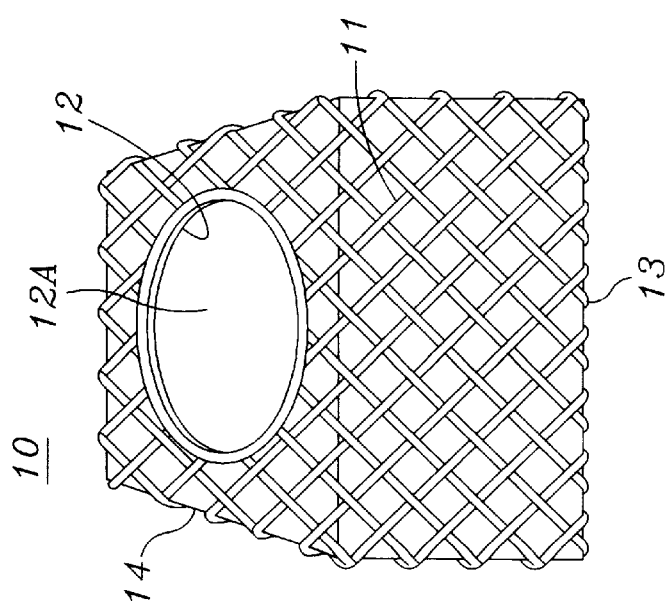

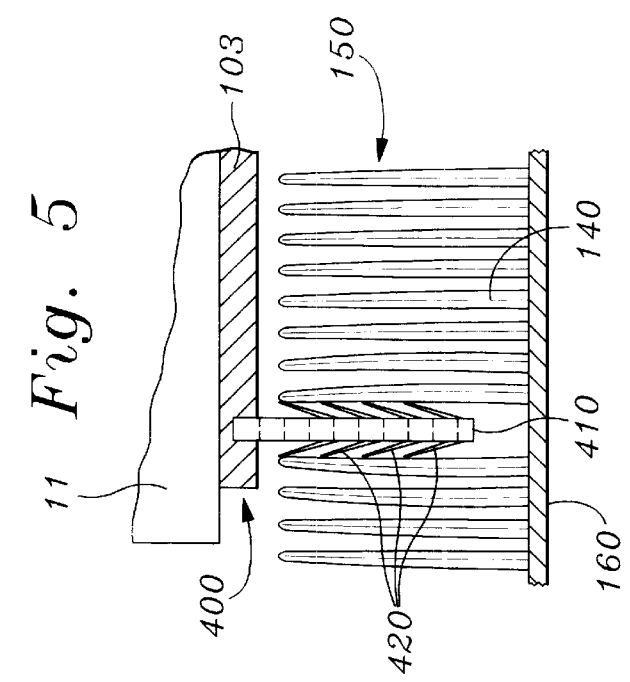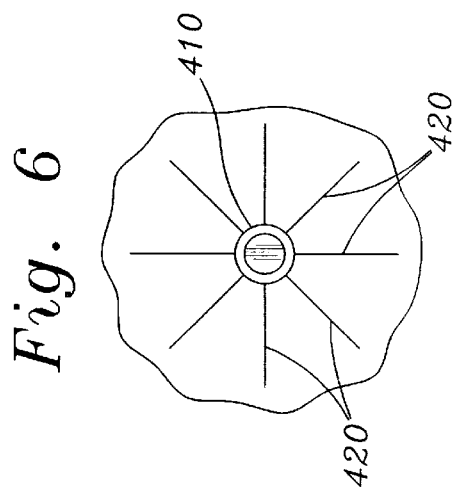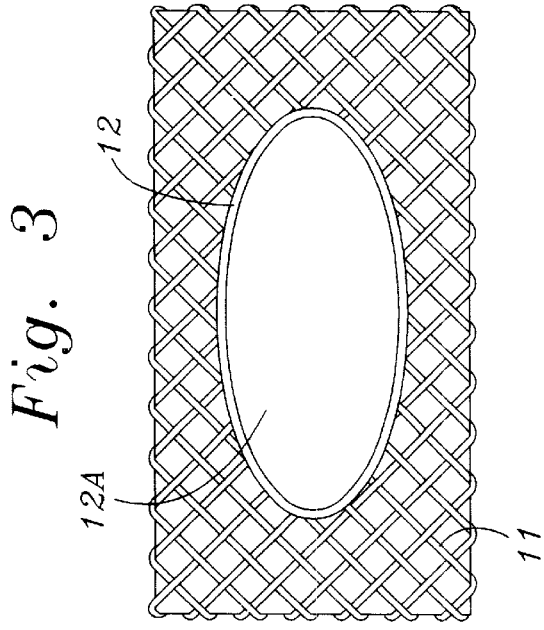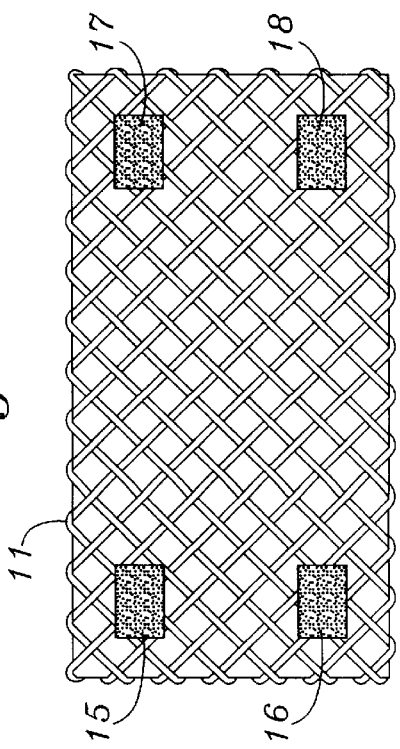

US 6,364,185 B2

SHEET OR TISSUE DISPENSER BOX HOLDER FOR CLINIC, VEHICLE, FACTORY OR HOUSEHOLD APPLICATIONS

CROSS-REFERENCE TO RELATED APPLICATION

This application is a continuation of copending application Ser. No. 09/318,177, filed May 25, 1999 and entitled "Sheet or Tissue Dispenser Box Holder for Clinic, Vehicle, Factory or Household Applications" now U.S. Pat. No. 6,196,435.

TECHNICAL FIELD

This invention relates to dispensers for fast access to sheet materials such as absorbing, wiping, cleaning and polishing sheets and cosmetic tissues which are desired to be stationary when located in a vehicle that is subject to roll, pitch or yaw movements, such as might be encountered in an automobile, boat, aircraft or spacecraft.

BACKGROUND OF THE INVENTION

Prior to this invention it has been difficult to hold a tissue dispenser box stationary in a moving vehicle with the tissues within reach of an individual whose attention is focused on some more important task. It would be desirable in such situations to provide means for holding such sheet material dispenser readily accessible to the user in virtually any environment and position.

The prior art does not suggest a universally applicable sheet dispenser box containing readily available sheet material which is mountable in a wide variety of places in any position and rigidly enough to allow drawing the sheets out in sequence without displacement of the dispenser box. The prior art does not teach a dispenser box holder that is expandable and conformable to hold various shapes and sizes of dispenser boxes, nor does it provide a holder that is not rigid and can be compressed and stored in a pocket when not in use.

SUMMARY OF THE INVENTION

In accordance with the invention, a tissue dispenser box holder is made up of stretchable cord or strap material arranged in a fish-net bag-like form with a draw sting or elastic molding joining the ends of the straps such that there is a stretchable opening to accommodate insertion of any common size dispenser box into the bag. Attachment means, such as fish hooks attached to the bag, hook and loop patches, glue patches, specially designed upholstery grabbers, or two-sided carpeting tape, can be used to attach the box holder to a wide variety of surface types. In certain environments, it may be desirable to attach the holder to a base, which can be a weight, for preventing movement of the dispenser. For most tissue boxes, a pull of two grams is sufficient to remove individual tissues. Thus, a base heavy enough to resist this force is all that is required to anchor the dispenser by means of gravity. The type of attachment means needed depends on the specific application environment.

In one embodiment using a weighted base, the elastic material can be fastened at both ends in a woven pattern forming a cloth when then is formed into a bag shaped container closed at the top except for an access opening that is preferably oval in shape. Because the straps are stretchable, the opening at the top can be enlarged by stretching to insert the dispenser box, where after the opening is used to access the contents of the box. A stretchable molding surrounding the opening at the top terminates the straps or cords at the top. The stretchable nature of the dispenser box holder can accommodate dispenser boxes of various shapes, for example, square, rectangular, round, etc. The contents can be accessed from the opening at the top, or the opening can be differently directed by attaching the holder on a side mounting surface.

An important feature of the invention is the method and means for retaining the dispenser box in a position where it will remain reliably in any attitude for the vehicle in which it is mounted. For hard surfaces, two-sided carpeting tape, patches or strips can be placed on the holder and the holder pressed on the structure to which it will be constrained.

For attachment to fabric, a patch consisting of adhesive material having hook elements extending therefrom is used to catch the strands of the fabric to hold the dispenser holder to the fabric surface which may be, for example, automobile interior carpeting. The hooks are advantageous for an installation that accommodates a pull direction perpendicular or at an angle to a carpeted or fabric upholstered mounting surface to which the holder can be attached. A plurality of patches containing bristle-hook elements may be used for deep piles. These are mounted on a base that can be secured inside or outside the holder bag. When the holder is pressed against the pile or web, tiny bristle-like members extending from molded plastic shaft members grab the carpet pile and resist pull-away of the holder from the carpet. A plurality of suction cup patches may be used to attach the holder to a metal or other hard smooth surface.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 is an endwise perspective view of a reusable, compressible and storable dispenser box holder constructed in accordance with the present invention and made of elastic cord or strap material in which a dispenser box is placed, ready for dispensing tissues;

FIG. 2 is a side perspective view of the dispenser box of FIG. 1 with the elastic cord material partially removed;

FIG. 3 is a top view of the dispenser box holder of FIG. 1 showing the aperture on the top and the molding terminating the elastic members;

FIG. 4 is a bottom view of the dispenser box holder showing representative positions of the attachment means;

FIG. 5 is a partially cross-sectional illustration of a pile-grabber bristle-hook attachment patch; and FIG. 6 is a bottom view of a bristle hook shaft and associated bristles for one of the bristle hook members of FIG. 5.

DETAILED DESCRIPTION OF THE ILLUSTRATED EMBODIMENTS

Referring to FIG. 1, there is shown a three-dimensional view of a tissue dispenser box holder 10 constructed in accordance with the present invention. Holder 10 includes stretchable woven cord netting material 11 arranged in a fish-net bag-like form. Elastic hem or molding material 12 is sewn onto the woven material 11 at the top ends of the woven cords 11 to form a dispensing aperture 12A for the tissues. Alternatively, an elastic drawstring can be used instead of a molding sewn on the ends of the cords.

Functionally, the dispenser box holder 10 includes a box cover 11 for a tissue dispenser box 14 containing stacked sheet material. The box holder 10 includes attachment patches 15–18 (FIG. 4) for attaching the box cover 11 and box 14 to various types of support surfaces. The stretchable net-like bag 11 can be conformed to any shape of tissue dispenser box by inserting the dispenser box into the bag 11 through the aperture 12A such that the tissues in box 14 can be accessed through the opening 12A which is bounded by the molding 12.

It is noted that the invention is a new combination wherein a sheet dispenser box 14 is inserted into a net bag 11 through an opening 12A at the top of the bag 11, such opening being bounded by the elastic molding 12. A plurality of attachment means 15–18 secured to the bottom portion 13 of bag 11 enable the attachment of the dispenser box holder 10 to a support surface. Representative attachment means include, for example, magnetic strips, suction cups, fish hooks, hook-and-loop fasteners, two-sided adhesive tape and other known anchoring means for resisting both lateral and vertical pull. Possible attachment means also include a novel pile hook structure as shown in FIG. 5.

The dispenser box holder 10 is attached to a desired support surface by exerting pressure on the holder 10 and pressing attachment means 15–18 against the mounting surface, enabling the attachment of the tissue dispenser box 14 and the drawing of tissue sheets from the box 14. These attachment means can be applied singly, depending upon the support surface to which it is to be attached, or in combination to increase the effectiveness of the attachment to the support surface.

FIGS. 3 and 4 show views of the top and bottom respectively of the dispenser box holder 10 of FIG. 2. The bottom view of FIG. 4 shows representative attachment patches 15–18 for attaching the box holder 10 to a support surface which may be, for example, metal, smooth plastic, rough finish plastic, fabric, glass, upholstery, carpeting, magnetic or wet surfaces. Glue sticking patches, or hook-and-loop patches for easy removability, may be used for hard surfaces. Patches having adhesive thereon can provide sufficient anchoring to smooth surfaces. For easy removability, hook-and-loop mating tape such as, for example, VELCRO brand attachment tape can be used for smooth surfaces.

Hard or smooth surfaces present no problem, but fabric and pile type coverings present a challenge that is addressed by the present invention. In this regard, FIG. 5 shows a representation of a horizontal piece of webbed pile carpeting 150 and a novel pile grabber attachment means 400 affixed to the box cover 11 for hooking onto and grabbing the carpeting 150. The carpeting 150 includes carpet strands 140 attached to a base mat 160. The attachment means 400 is comprised of a plastic base member 103 in which are molded or otherwise mounted a multiplicity of pile grabber hook elements consisting of multiple shaft members 410 having upwardly slanted flexible wire elements 420 attached thereto such that, when the attachment means 400 is pressed into the carpeting pile 140, the pile grabber elements 420 hook onto the pile strands 140 of the carpeting 150, resisting any attempt to pull the tissue box holder 11 from the carpeting 150.

While there have been described what are at present considered to be preferred embodiments of this invention, it will be obvious to those skilled in the art that various changes and modification may be made therein without departing from the invention and it is, therefore, intended to cover all such changes and modifications as come within the true spirit and scope of the invention.

What is claimed is:

1. A reusable holder for a tissue dispenser box, such holder comprising:

a tissue dispenser box cover comprising a plurality of cords arranged in a fish-net pattern and forming a container stretchable to fit snugly around a tissue dispenser box and having a top opening for receiving the tissue dispenser box;

and at least one attachment means fastened to the box cover for attaching the box cover to a support surface;

whereby a tissue dispenser box can be inserted into the box cover through the top opening for enabling the dispenser box to be held in place on the support surface by the attachment means for enabling tissues to be withdrawn from the dispenser box, the box cover being compressible for storage when not in use.

2. A reusable holder for a tissue dispenser box, such holder comprising:

a tissue dispenser box cover comprising a plurality of cords arranged in a fish-net pattern and forming a container sized to fit snugly around a tissue dispenser box and having a top opening for receiving the tissue dispenser box;

and at least one attachment means fastened to the box cover for attaching the box cover to a support surface;

whereby a tissue dispenser box can be inserted into the box cover through the top opening for enabling the dispenser box to be held in place on the support surface by the attachment means for enabling tissues to be withdrawn from the dispenser box, the box cover being compressible for storage when not in use.

3. A tissue dispenser box holder in accordance with claim 2 wherein the box cover includes elastic material which is attached to the cords at the top opening and which extends around the top opening.

4. A tissue dispenser box holder in accordance with claim 2 wherein the attachment means includes at least one glue patch for adherence to the support surface.

5. A tissue dispenser box holder in accordance with claim 2 wherein the attachment means comprises two-sided carpeting tape.

6. A tissue dispenser box holder in accordance with claim 2 wherein the attachment means includes at least one hook-and-loop attachment patch affixed to the box cover.

7. A tissue dispenser box holder in accordance with claim 2 wherein the attachment means includes at least one hook-type VELCRO patch.

8. A tissue dispenser box holder in accordance with claim 2 wherein the attachment means is comprised of a plurality of hook-and-loop attachment patches, with one member of each patch being sewn onto the box cover.

9. A tissue dispenser box holder in accordance with claim 2 wherein the attachment means is comprised of a plurality of attachment means fastened to the bottom portion of the box cover.

10. A tissue dispenser box holder in accordance with claim 2 wherein the attachment means is comprised of a plurality of attachment patches fastened to the bottom portion of the box cover.

11. A tissue dispenser box holder in accordance with claim 2 wherein the attachment means is comprised of a set of four attachment patches fastened to the bottom portion of the box cover.

12. A reusable holder for a tissue dispenser box, such holder comprising:

a tissue dispenser box cover comprising a plurality of expandable straps arranged in a woven pattern and forming a container sized to fit snugly around a tissue dispenser box and having a top opening for receiving the tissue dispenser box;

and at least one attachment means fastened to the box cover for attaching the box cover to a support surface;

whereby a tissue dispenser box can be inserted into the box cover through the top opening for enabling the dispenser box to be held in place on the support surface by the attachment means for enabling tissues to be withdrawn from the dispenser box, the box cover being compressible for storage when not in use.

13. A tissue dispenser box holder in accordance with claim 12 wherein the box cover includes elastic material which is attached to the straps at the top opening and which extends around the top opening.

* * * * *